INVENTORS
L. D. BABUSCI
B. A. CRETELLA
D. O. FEDER
D. E. KOONTZ
BY

ATTORNEY

United States Patent Office

3,490,954
Patented Jan. 20, 1970

3,490,954
LEAD-ACID CELL
Louis D. Babusci, West Orange, Biagio A. Cretella, Edison, David O. Feder, Madison, and Donald E. Koontz, Summit, N.J., assignors to Bell Telephone Laboratories, Incorporated, Murray Hill, N.J., a corporation of New York
Original application May 23, 1966, Ser. No. 552,081, now Patent No. 3,434,883. Divided and this application Oct. 31, 1968, Ser. No. 778,900
Int. Cl. H01m 1/02
U.S. Cl. 136—168                                                     1 Claim

ABSTRACT OF THE DISCLOSURE

The specification describes a post seal arrangement for a lead-acid battery. The seal is a resilient bellows which permits relative movement between the cell receptacle and the grids to which the post is attached.

---

This application is a division of application Ser. No. 552,081, filed May 23, 1966, now Patent No. 3,434,883, and relates to lead-acid storage batteries. More specifically it is directed to a totally new cell design which represents a significant departure from that of existing commercial batteries.

Secondary batteries of the lead-acid type have traditionally been constructed in a regular hexadron form or box-like configuration, with vertically disposed rectangular plates. This design has an attractive shape from several standpoints and the flat planar plate is attractive from a manufacturing standpoint. The vertically disposed plates are ideal for permitting gases formed on the plates to bubble off out of the active battery region.

In view of these advantages and the absence of any recognized shortcomings, there has been, until now, no significant reason to consider design changes. However, recent studies of the failure mechanisms of commercial lead-acid batteries have provoked inquiries into the soundness of this design and have resulted in a battery configuration with accompanying detailed features which present radical departures from the classical box receptacle and rectangular plate.

A significant use for commercial lead-acid batteries is for standby power in telephone plant locations which represents an investment of several hundred million dollars. Such cells are characteristically operated on a float basis, i.e., the cells are maintained in a fully charged state by virtue of line charging which maintains the battery at an overpotential of several hundred millivolts. In such a floating scheme, where power is required in a rare emergency, the life expectancy of the batteries is significantly greater than that of batteries which are used for primary power and are regularly cycled. Batteries designed for this purpose should have a useful life of considerably more than ten years.

However, recent experiences with battery failures indicate that the expected battery lifetimes are not being realized. A thorough investigation of the failure mechanisms has revealed that many of these premature failures can be attributed to the physical design and structural shape of the battery receptacle and particularly the battery plates.

The prevalent causes of failure of lead-acid cells of the conventional design in float service are consequences of excessive growth of the battery grid assembly on aging. The positive grids and associated support structures expand in size due in part to electrolytic formation of an insoluble species of lead oxide on the positive grid. Ultimately the grid becomes so severely distorted that the ribs of the grid no longer retain the active material which falls away from the plate thus reducing the charge capacity of the cell.

In studying the manner in which the positive grid grows, it has been found that the rectangular grid construction is an undesirable structure from this standpoint. The stresses which form in the interior portions of the grid radiate to the edges but, since the grid extremity is rectangular in shape, the stresses developed are nonuniform. Furthermore, in the conventional grid design there is little structural strength provided by the grid itself to counteract the effect of these stresses. These factors result in a grid which deforms readily on aging and deforms in an unpredictable manner. The grids may buckle together, shorting through the separators; the corners often tend to separate due to the concentration of stress at that point, and in extreme cases, the battery receptacle may rupture due to the strain of containing the growing members. The seal between the connecting posts and the cover of the receptacle is particularly vulnerable as corrosion of the grid assembly places stresses on the connecting posts.

The re-evaluation of the rectangular plate design occasioned by these battery failures, resulted in other observations suggesting that this is a poor design. In particular, the current distribution, that is, the feeding and collecting of current from the plates is grossly nonuniform. In the conventional cell configuration an electrical lead tab is provided on one corner of the upper edge of each plate. It will be appreciated that the current path to the active material on the lower corner of the plate away from the aforesaid tab will have to be a considerable distance longer as compared with that for regions proximate the collector tab. This factor may not be important in a new or healthy battery when used at moderate discharge rates since ordinarily there is an insignificant difference in the relative resistances of the electrical paths. However, in batteries destined for long term use, where growth of the grid is likely to occur, or where the cell is discharged at high rates, the differences in the relative resistance values of electrical paths over the grid surface can become appreciable, thereby resulting in ineffective utilization of the active material on all regions of the plate. The result can be a significant reduction in the cell capacity.

Certain of these and other problems are at least partly overcome by the battery design of the present invention. In this new design the grids are made essentially circular rather than rectangular and are stacked, in a novel stacking arrangement, to form a cylindrically-shaped battery. The positive grids which are susceptible to excessive growth on aging are provided with a strong peripheral retaining ring to counteract stresses arising as the plate corrodes. The construction of the cell, so as to provide physical strength to the grid members, is believed to be a novel battery design concept. To provide for the evolution of gases from the plate surfaces, the plates are inclined towards, or away from, the center of the cell. The latter two alternatives are believed to be essentially equivalent. The radial members of the grid may extend radially in a straight line or may be designed in such a fashion to insure that, upon growth, they expand in a predictable and cooperative way. In the latter case the radial members can be made arcuate in such a manner that outward stresses on these members tend to increase their curvature and thereby exert a minimum of extensional stress on the retaining ring forming the outer extremity of the grid. In contrast to the poor current distribution encountered in the usual rectangular grid assembly, the feeding and collecting of current around the entire periphery of the grid of this invention results in even current distribution over the plate area so that all of the active material is effectively utilized. Other construction details which form further bases for this invention will become evident from the following more detailed description.

Figure 1:
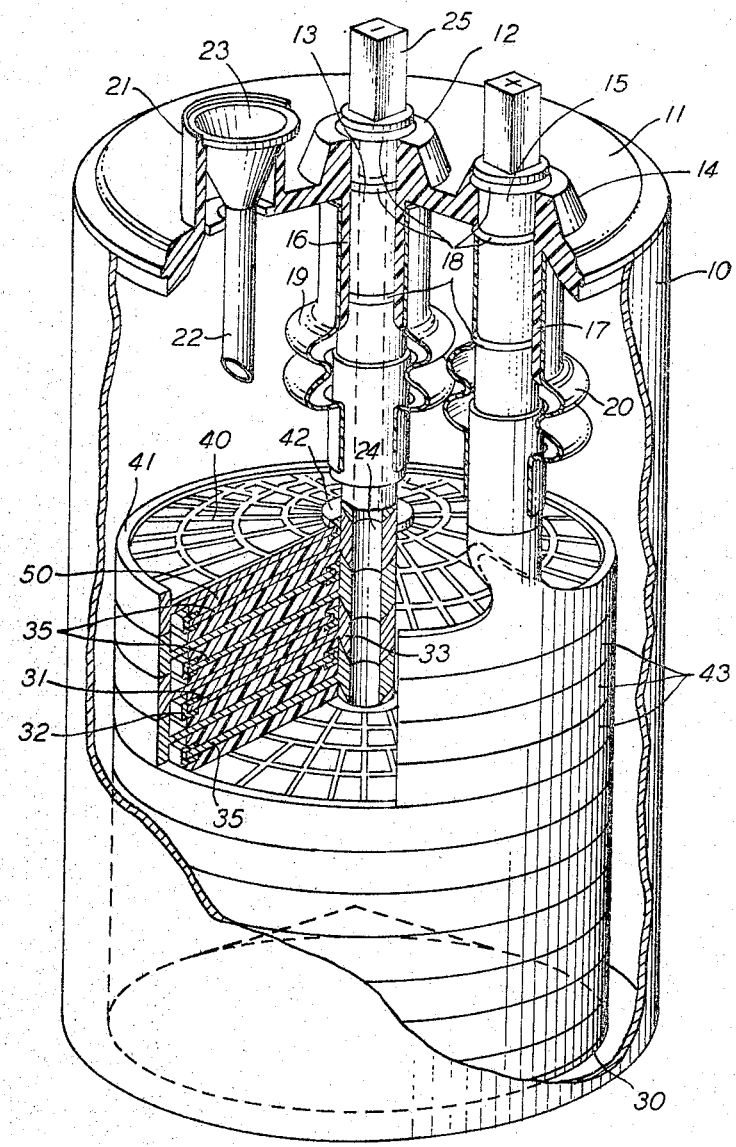
FIG. 1 is a perspective view largely cut away, of a cell unit constructed according to this invention.

FIG. 1 shows the novel battery design in a front perspective view largely cut away to show the details of the grids and particularly the stacking arrangement. The battery receptacle 10 is of a standard material but is cylindrically shaped to accommodate the stack of circularly-shaped grids. The cover 11 of the receptacle is shown partly cut away and is provided with three openings. The flange 12 defines an opening for the negative post 13 and the flange 14 surrounds the opening for the positive post 15. The flanges 12 and 14 include depending portions 16 and 1 which protrude below the cover 11 and form a seat for the posts 13 and 15. The post construction includes several O-rings 18 which provide for vertical alignment of the posts and restrict their lateral movement. The O-rings also provide a secondary seal for the post in cases of failure of the primary seal and thus are advantageously made from an acid-resistant material such as neoprene. The primary seals are flexible tubes 19 and 20 and must be of acid-resistant material. In a preferred embodiment these seals are made with acid-resistant, preformed, heat-shrinkable sleeves with bellows as shown, allowing for relative movement between the posts and the receptacle cover. In some cases the material will be elastic enough so that the preformed bellows may be unnecessary. The sleeve may also have a heat-bondable substance lining its interior portion so that a heat seal can be easily made to the post and the cover during fabrication. Appropriate acid-resistant materials for the seals 19 and 20 are neoprene, polyethylene, polypropylene, PVC and Teflon. This seal design, which permits relative movement between the connecting posts and the cell cover, is largely a precaution against unusual growth conditions or uses in which the cell is subject to severe and frequent shock as in mobile equipment. Since the basic construction of the cell is such that growth of the grid assembly is minimized, ordinary post seals are generally adequate.

The remaining opening in the cover assembly is surrounded by a vertical cylindrical flange 21 which accommodates a filling funnel 22. The filling funnel 22 combines as a flash arrestor and a hydrogen vent. The upper region 23 of the funnel is microporous which permits venting and rapid dispersal of hydrogen from the cell interior but prevents ignition of the hydrogen from flames or sparks originating outside of the cell. The funnel is generally rigid and constructed of microporous polyethylene, polypropylene, Teflon, ceramic, stoneware or similar acid-resistant material.

The grid assembly is composed of positive and negative grids stacked alternately in a vertical interleaving arrangement. The base plate 30 supports the stack and is shaped to slope upward toward the cell center. This sloping characteristic is common to all of the stacked grids as shown in FIG. 1. The lowermost element is a negative grid, which is identical to grid 31 shown in the cut away portion of FIG. 1, and has the general conical shape shown. The grid is provided with an insulating rim 32 of acid-resistant material, such as neoprene or rubber, which surrounds its outer edge. The rim is thicker than the grid to maintain electrical insulation of the outer regions of the grid from the next grid. This rim 32 also serves to prevent "mossing" or dendritic growth at the edges of the grid. The innermost region of the negative grid is cast with an interlocking hub 33 which engages the next lowermost negative grid for support. The upper edge of the hub is designed with an interior bevel to accommodate another negative grid hub in interlocking arrangement as shown. The remaining negative grids 35 are the same in design. As will be appreciated the negative grids are largely supported and aligned by the interlocking members at the center post although additional support is provided over the entire grid area by the stacking arrangement. Favorable grid compression is also achieved and maintained over the entire grid area.

The positive grids are stacked in a similar manner but are joined together and largely supported at the periphery of the cell. The positive grid 40 is provided with a heavy external flange portion 41 which encircles the periphery of the positive grid and acts as a retaining ring against grid growth as well as providing grid support in the stacking arrangement. The edge of the inner concentric ring of the grid carries an insulating rim 42 for the same purpose as the negative grids. The remaining positive grids 43 are essentially identical in construction.

The arrangement for joining the grid assembly to the electrode posts 13 and 15 is evident from FIG. 1. The negative post 13 seats within the hub of the top negative grid, and the positive post 15 is welded or otherwise affixed to the upper peripheral rim of the top positive grid.

While the grids are stacked in electrical contact it is usually preferred that a more positive contact be made. This is ordinarily obtained by welding the grids together at their points of contact. However, it is inconvenient and costly to weld the negative grids together since the center post opening is generally small enough to make a welding operation difficult. An added aspect of this invention involves the method for electrically joining the stacked negative grids. After the assembly is completed molten lead, or a molten low-melting alloy with a melting point preferably no more than 100° C. higher than the melting point of the grid, is poured into the hollow center post section. As seen in FIG. 1 the negative post 13 is initially made with a hollow bore 24. The molten material is poured through the hollow bore to a level substantially above the point where the post and the uppermost negative grid are joined. This insures that as the molten material contracts on cooling it does not contract below an essential bonding region. The contact block 25 which comprises the top of the post may be threaded within the bore 24 or affixed by other appropriate means. Upon hardening the desired electrical interconnection between the negative grids and the negative post is complete. Alternatively a sleeve or bar of low-melting solder can be inserted into the hollow center section of the stacked assembly and the bond made by heating either the entire assembly or selectively heating the center post region. Alternatively, the hub portion 33 of each negative grid may be precoated, as by dipping, with a heat-sealable electrically conductive material which again may be a low-melting lead solder. The bonds are made by heating after assembly of the grid stack. In some cases the bonding material may be epoxy or other nonconducting adhesive. The positive grids may be joined by these same methods.

The separator 50 between each grid is ordinarily a molded separator of a conventional material such as microporous rubber with a layer or multilayers of fiber-glass. The separators per se, useful for this invention, are conventional and well known in the art and form no essential part of this invention.

Various alternatives to the stacking arrangement of the cell and particularly in the details of the interlocking joints of the negative grids will be readily obvious to those skilled in the art. These details are given as exemplary only, although in some cases they form preferred embodiments.

Figure 2B:
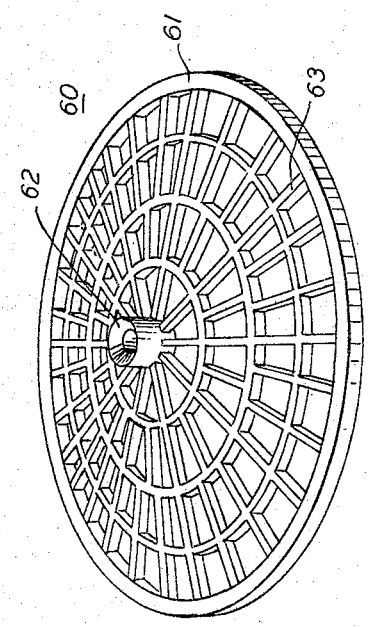
FIG. 2B is a perspective view of an alternative grid form of the invention.
Figure 2A:
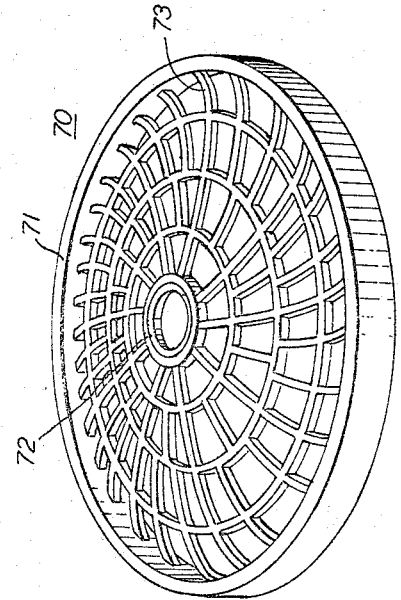
FIG. 2A is a perspective plan view of one grid form of the invention.

The details of the grid design are shown in FIGS. 2A and 2B. FIG. 2A is a perspective view of a negative grid showing one alternative form of the arrangement of the radial structural members of the grid. The grid 60 will normally be cast or punched in one piece from lead or a lead alloy. The pattern of the radial structural members 63 may be varied as desired. No criticality is alleged with this particular arrangement of the radial rib members. The insulating rim 61 and the hub 62, which were described in connection with FIG. 1, are more clearly shown.

FIG. 2B is a perspective view of an alternative grid construction specially designed for a positive grid. As indicated previously it is the positive grid which is susceptible to corrosion and is likely to expand on aging. Accordingly, the grid is made circular with a peripheral retaining ring for structural strength and stress control. For purposes of defining this novel structure in a preferred form, the peripheral ring should have a thickness of at least twice the thickness of the radial grid members. In FIG. 2B the grid designated 70 is shown with the heavy peripheral retaining ring 71 and the insulating rim 72 which corresponds generally with the rim 42 of FIG. 1. The radial grid members 73 are specially designed so that upon the growth of the grid, which causes outward stresses on the radial members 73, these arcuate members will merely flex further and therefore will impart a smaller radial stress than would be the case with a grid having straight radial members. Furthermore, the distortion of the radial members is cooperative in the sense that all members will distort in the same direction and pattern, minimizing the tendency of the members to grow together or to buckle as in the case of flat rectangular grids. As these members expand they continue to exert pressure on the paste pellets held within the spaces of the grid. This is also a result which is not realizable with typical prior art grid designs.

As indicated prevously the gird area must be inclined although it is not considered critical whether the grids are inclined toward, or away from, the center of the cell. The angle which the grid surface makes with the horizontal is a matter of choice. The angle must be great enough to encourage the dispelling of gases formed on the grid surfaces during operation. However, from a structural viewpoint small angles are favorable. It is believed that a useful range of angles is prescribed by the range 10° to 40°. With certain minor modifications of the cell construction, particularly in the venting arrangement, the cell can be used with the grids placed side-by-side in a horizontal stack. In this case the grids may be flat. This mode of operation is considered the full equivalent of the vertically stacked assembly described in detail herein.

The grids are pasted in a standard manner and the paste used and pasting method form no part of this invention. A typical pasting operation is described in "Storage Batteries," 4th ed., by G. W. Vinal, pp. 30 et seq., John Wiley & Sons, Inc. To facilitate gas removal, spaces may be provided through each grid in approximate vertical alignment with the adjacent grids in the stack so that a gas path is available from the bottommost grid to the area above the top plate and the vent. With the arrangement of FIG. 1 the gas holes would be in the center of the cell. Four holes equally spaced around the inner periphery are adequate with this design. More holes can be provided if desired. If the grids are inclined in the opposite direction the gas holes should be provided around the periphery of the cell.

The composition of the grid members also is not critical. The design of the positive grids according to the invention which provides a structuarally strong member permits the use of pure lead as the grid material. However, since lead is quite soft, a grid having greater strength is obtained with a lead-calcium alloy in which the calcium content is less than 0.1 per cent. This alloy is harder than lead but is more difficult to cast than either pure lead or the common grid material, lead-antimony alloy having three per cent to twelve per cent antimony. The latter material is useful also for the grids of this invention.

The electrolyte used is a standard sulfuric acid-water solution. Electrolyte compositions useful for this invention are discussed in "Storage Batteries," 4th ed., by G. W. Vinal, pp. 103 et seq., John Wiley & Sons, Inc.

Whereas the foregoing description has been set forth in detail certain of the features described are not essential to the invention in its broadest aspects.

Various additional modifications and extensions of this invention will become apparent to those skilled in the art. All such variations and deviations which basically rely on the teachings through which this invention has advanced the art are properly considered within the spirit and scope of this invention.

What is claimed is:

1. A lead-acid cell comprising in combination, a receptacle containing a grid assembly of alternate positive and negative grids, a cover lid for said receptacle containing at least two openings each having a flange around the opening extending down into the cell receptacle, an electrode post connected to the negative grid members and extending through one of said holes and its associated flange, an electrode post connected to the positive grid members and extending through the other of said holes and its associated flange and a sealing means for establishing a gas-tight seal between at least one of said electrode posts and the flange through which it extends, the sealing means comprising a flexible tube of acid-resistant material, said tube being sealed to the flange at one end and to the electrode post at the other end thereby providing sufficient resiliency to permit limited movement of the post with respect to the cover lid.

References Cited

UNITED STATES PATENTS

| 1,364,861 | 1/1921 | Bliss | 136—168 |
| 2,148,738 | 2/1939 | Feldtkeller | 136—168 |

FOREIGN PATENTS

| 6,132 | 1904 | Great Britain. |

WINSTON A. DOUGLAS, Primary Examiner

D. L. WALTON, Assistant Examiner

U.S. Cl. X.R.

136—177